(12) United States Patent
Dedeoglu et al.

(10) Patent No.: US 10,771,801 B2
(45) Date of Patent: Sep. 8, 2020

(54) REGION OF INTEREST (ROI) REQUEST AND INQUIRY IN A VIDEO CHAIN

(71) Applicant: Texas Instruments Incorporated, Dallas, TX (US)

(72) Inventors: Goksel Dedeoglu, Plano, TX (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 345 days.

(21) Appl. No.: 14/027,925

(22) Filed: Sep. 16, 2013

(65) Prior Publication Data

US 2014/0079118 A1    Mar. 20, 2014

Related U.S. Application Data

(60) Provisional application No. 61/703,908, filed on Sep. 21, 2012, provisional application No. 61/701,101, filed on Sep. 14, 2012.

(51) Int. Cl.
| | |
|---|---|
| *H04N 19/46* | (2014.01) |
| *H04N 19/17* | (2014.01) |
| *H04N 19/40* | (2014.01) |
| *H04N 19/167* | (2014.01) |
| *H04N 19/124* | (2014.01) |

(52) U.S. Cl.
CPC ........... *H04N 19/46* (2014.11); *H04N 19/124* (2014.11); *H04N 19/167* (2014.11); *H04N 19/17* (2014.11); *H04N 19/40* (2014.11)

(58) Field of Classification Search
None
See application file for complete search history.

(56) References Cited

U.S. PATENT DOCUMENTS

| | | | |
|---|---|---|---|
| 7,557,840 B2 | 7/2009 | Ladouceur et al. | |
| 2004/0177383 A1 | 9/2004 | Martinolich et al. | |
| 2005/0271304 A1* | 12/2005 | Retterath | G06K 9/3233 |
| | | | 382/305 |
| 2006/0215753 A1* | 9/2006 | Lee | H04N 7/147 |
| | | | 375/240.08 |
| 2007/0024706 A1* | 2/2007 | Brannon, Jr. | H04N 7/17318 |
| | | | 348/142 |
| 2008/0063196 A1 | 3/2008 | Evans et al. | |
| 2010/0119157 A1* | 5/2010 | Kameyama | H04N 19/115 |
| | | | 382/195 |

(Continued)

OTHER PUBLICATIONS

Goksel Dedeoglu and Madhukar Budagavi, "Region of Interest (ROI) SEI Message", JCTVC-K0247, Joint Collaborative Team on Video Coding (JCT-VC) of ITU-T SG 16 WP 3 and ISO/IEC JTC 1/SC 29/WG11, pp. 1-7, Oct. 10-19, 2012, Shanghai, China.

(Continued)

*Primary Examiner* — James M Anderson, II
(74) *Attorney, Agent, or Firm* — Ebby Abraham; Charles A. Brill; Frank D. Cimino (57) ABSTRACT

A method for video stream processing in a video chain is provided that includes transmitting a video stream in the video chain, receiving, by a first video node in the video chain, a region of interest (ROI) command from a second video node in the video chain, wherein the ROI command includes an ROI type indicator, and performing, by the first video node, the ROI command according to the ROI type indicator.

18 Claims, 10 Drawing Sheets

(56) References Cited

U.S. PATENT DOCUMENTS

2010/0183070 A1* 7/2010 Lu .................... H04N 19/61
375/240.08

OTHER PUBLICATIONS

Goksel Dedeoglu and Madhukar Budagavi, "Region of Interest (ROI) SEI Message", JCTVC-K0247 Presentation, Joint Collaborative Team on Video Coding (JCT-VC) of ITU-T SG 16 WP 3 and ISO/IEC JTC 1/SC 29/WG11, pp. 1-6, Oct. 10-19, 2012, Shanghai, China.

H. Schulzrinne, et al, "Real Time Streaming Protocol (RTSP)", Network Working Group, Request for Comments 2326, The Internet Society, pp. 1-93, Apr. 1998.

J. Rosenberg et al, "SIP: Session Initiation Protocol", Network Working Group, Request for Comments, 3261, The Internet Society, pp. 1-269, Jun. 2002.

"TMS320DM6467 Digital Media System-on-Chip", SPRS403G, Texas Instruments Incorporated, Dec. 2007, revised Oct. 2010, pp. 1-355.

* cited by examiner

REGION OF INTEREST (ROI) REQUEST AND INQUIRY IN A VIDEO CHAIN

CROSS-REFERENCE TO RELATED APPLICATIONS

This application claims benefit of U.S. Provisional Patent Application Ser. No. 61/701,101, filed Sep. 14, 2012 and U.S. Provisional Patent Application Ser. No. 61/703,908, filed Sep. 21, 2012, which are incorporated by reference herein in their entirety.

BACKGROUND OF THE INVENTION

Field of the Invention

Embodiments of the present invention generally relate to communicating requests and inquiries related to regions of interest (ROI) in pictures of a video stream both upstream and downstream in a video chain.

Description of the Related Art

Region of interest (ROI) based video coding is used in practice to improve video quality in regions of pictures in video streams such as human faces, text, and graphical elements such as logos. Content analysis is performed in which image analysis and understanding techniques such as face detection, text detection, foreground-background segmentation, etc. are used to determine ROIs and the relative priorities of the ROIs. Such ROI-based video coding is difficult to use in cloud computing and video infrastructure applications in which it is common to chain multiple encode-decode nodes to prepare video content for delivery to end-users. In such cascaded video pipelines, which may also be referred to as video chains, there is no ready mechanism to communicate and consistently preserve ROI information throughout the pipeline thus possibly leading to video quality degradation in the ROIs.

SUMMARY

Embodiments of the present invention relate to methods and systems for ROI request and inquiry in a video chain. In one aspect, a method for video stream processing in a video chain is provided that includes transmitting a video stream in the video chain, receiving, by a first video node in the video chain, a region of interest (ROI) command from a second video node in the video chain, wherein the ROI command includes an ROI type indicator, and performing, by the first video node, the ROI command according to the ROI type indicator.

In one aspect, a video chain is provided that includes a first video node and a second video node. The video chain is configured to perform a method for video stream processing that includes transmitting a video stream in the video chain, receiving, by a first video node in the video chain, a region of interest (ROI) command from a second video node in the video chain, wherein the ROI command includes an ROI type indicator, and performing, by the first video node, the ROI command according to the ROI type indicator.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Specific embodiments of the invention will now be described in detail with reference to the accompanying figures. Like elements in the various figures are denoted by like reference numerals for consistency.

Figure 1:
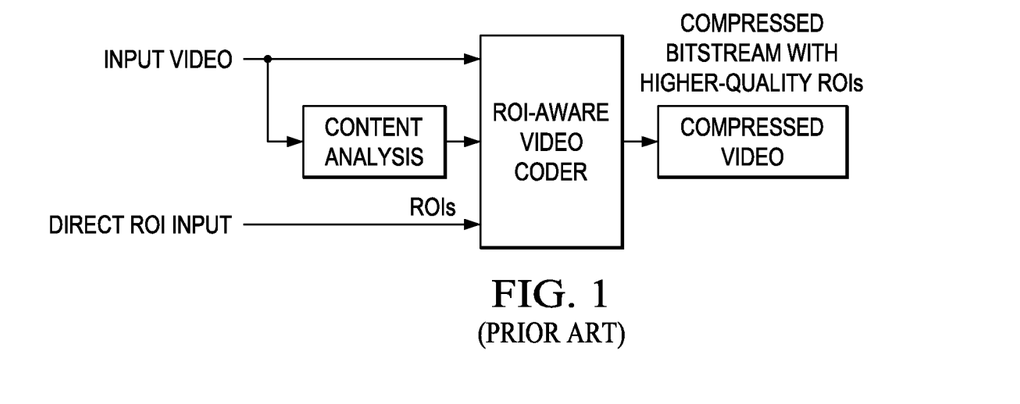
FIG. 1 is an example illustrating region of interest (ROI) based video coding.

As previously mentioned, region of Interest (ROI) video coding is used in practice to improve video quality in regions of pictures in a video stream. These regions of interest may be, for example, regions with human faces, text, and graphical elements such as logos. FIG. 1 is an example illustrating ROI-based video coding. The process may involve two steps: (a) video content analysis to determine the locations of ROIs, and (b) ROI aware encoding that takes as input all available ROI information and a picture and generates a compressed bit stream in which the ROIs may be encoded differently from other parts of the picture. The ROIs may be identified externally independent from the input video stream and provided to the video encoder or may be identified from the input video stream using content analysis. The content analysis module uses image understanding and content analysis techniques such as face detection, text detection, foreground-background segmentation, etc. to determine ROIs in pictures of the video stream and the relative priorities of these ROIs.

The video encoder may then use the ROI information to perform different encoding on the ROIs in a picture than on the remainder of a picture. For example, the video encoder may modulate the quantization step size for ROIs according to ROI priorities. That is, an ROI with higher priority may be quantized using a small quantization step size (yielding higher fidelity reconstructions), while an ROI with lower priority may be quantized using a larger quantization step size (yielding larger compression artifacts). In another example, the video encoder may select different encoding tools for the ROIs based on content of the ROIs and the priorities. For example, the video encoder may choose to whether or not to apply transforms in an ROI based on the content, e.g., if the ROI contains high frequency text, application of a transform does not help the coding process very much and can be skipped.

ROI based encoding may not be able to be fully exploited in cloud computing and video infrastructure applications in which it is common to chain multiple encode-decode nodes to prepare video content for delivery to end-users. Examples of encode-decode nodes that may be included in a video chain include multipoint video conferencing, overlaying text or logos on top of existing video content, server based video stabilization and quality enhancement, trans-rating between bit-rate/quality options, and transcoding from one video standard to another. Such cascaded video pipelines offer no ready mechanism to communicate ROIs both upstream and downstream between nodes in the chain. Such communication may be desirable, for example, to allow one node to request better quality encoding of ROIs by an upstream node or to allow one node to exploit ROI identification (e.g., content analysis) capabilities of another node in the chain.

Embodiments of the invention provide for communicating requests and inquiries related to regions of interest (ROIs) in pictures of a video stream both upstream and downstream in a video chain. A region of interest may be a subset of a picture in the video stream or may be an entire picture. More specifically, a protocol is provided for communicating ROI requests and inquiries between nodes in a video pipeline. As is explained in more detail herein, the ROI protocol, which may be implemented as an extension of a standard network protocol such as the Real Time Streaming Protocol (RTSP) or the Session Initialization Protocol (SIP), provides functionality for inter-node commands to, for example, request better image quality in ROIs or inquire for identification of ROIs.

The Session Initiation Protocol (SIP) is a signaling communications protocol, widely used for controlling multimedia communication sessions such as voice and video calls over Internet Protocol (IP) networks. This protocol is described in J. Rosenberg, et al, "SIP: Session Initialization Protocol," RFC3261, Internet Engineering Task Force, June, 2002, which is incorporated by reference herein. The Real Time Streaming Protocol (RTSP) is a network control protocol designed for use in entertainment and communications systems to control streaming media servers. The protocol is used for establishing and controlling media sessions between end points. Clients of media servers issue VCR-like commands, such as play and pause, to facilitate real-time control of playback of media files from the server. This protocol is described in H. Schulzrinne, et al, "Real Time Streaming Protocol (RTSP)," RFC2326, Internet Engineering Task Force, April, 1998, which is incorporated by reference herein.

Figure 2:
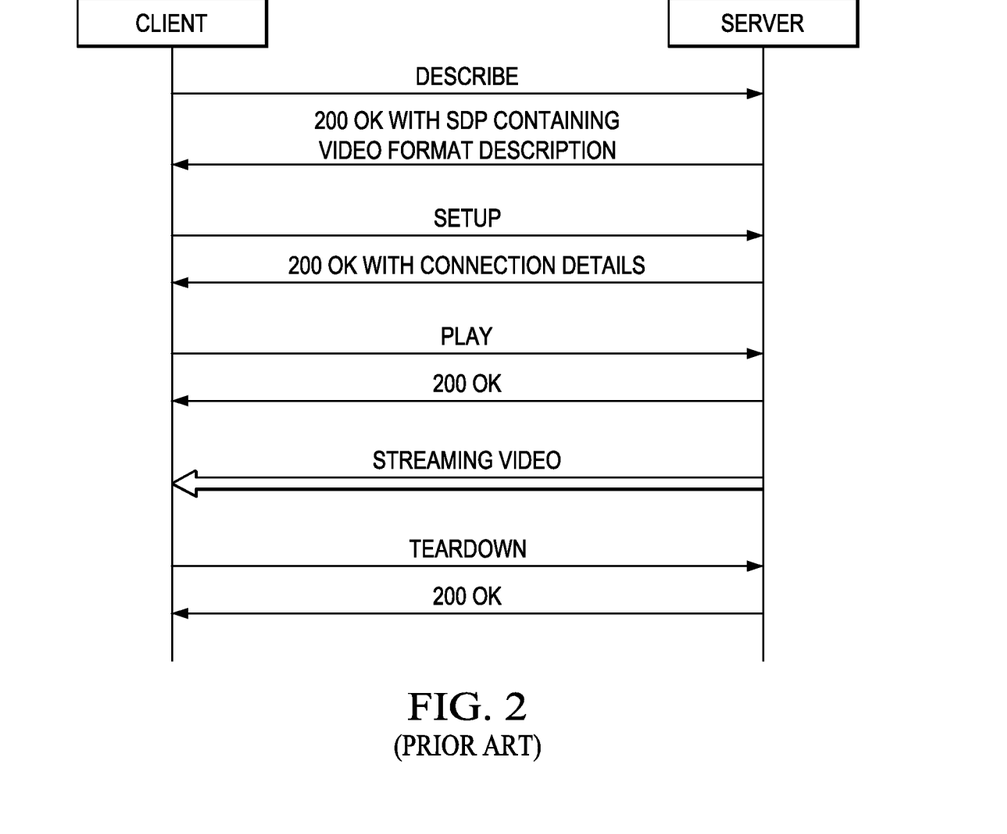
FIG. 2 is an example illustrating a prior art Real Time Streaming Protocol (RTSP) video streaming session.

Embodiments are described herein assuming that the ROI protocol is an extension of RTSP. One of ordinary skill in the art, having benefit of this description, will understand embodiments using SIP or other suitable network or video protocols. FIG. 2 is an example illustrating a prior art RTSP video streaming session between a server and a client. The client first sends a DESCRIBE request to the server to obtain media format details of the video clip to be streamed. The server responds back with details in the form of an SDP (Session Description Protocol) message. Assuming the client can decode the format of the video stream provided by the server, the client sends a SETUP request to obtain the connection details, e.g., the port number to use for the video and audio in the video clip. The server responds with the connection details. The client then sends a PLAY request to initiate streaming of the video from the server. After the video clip has played out or at the client's request, the streaming session is terminated by the client using a TEARDOWN request.

Figure 3:
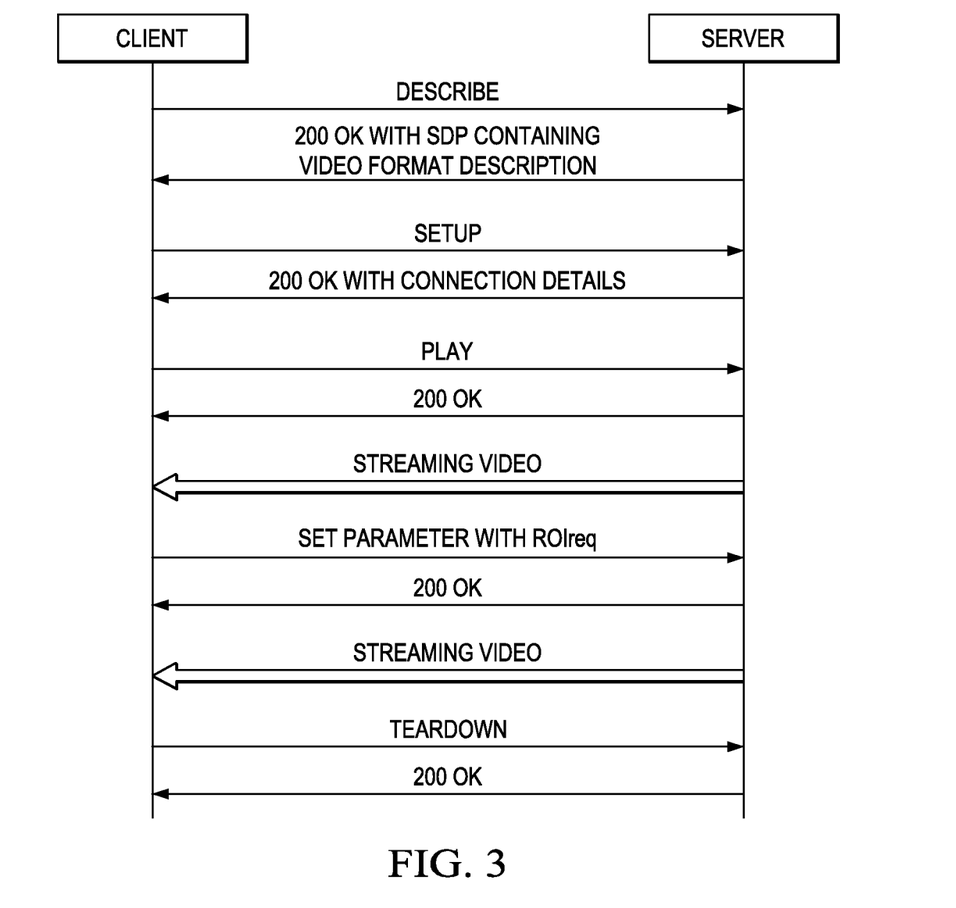
FIGS. 3-5 are examples using RTSP extended with an ROI protocol in a video streaming session.

The ROI protocol extends RSTP with ROI commands, e.g., an ROI request, ROIreq, and an ROI inquiry, ROIinq. A ROIreq may be used to request better video quality in ROIs of a video stream. A ROIinq may be used, for example, to request content analysis to identify ROIs of specific types or to generally request identification of ROIs. FIG. 3 is an example showing an RTSP video streaming session including a ROIreq. The streaming video session set-up (DESCRIBE and SETUP) occurs as described in reference to FIG. 2. The client then requests playback using the PLAY request and the server starts streaming the video. During the course of the streaming, the client may send a ROIreq message to the server to request better quality in one or more specified ROIs.

The ROIreq is accomplished by extending the SET_PARAMETER request to include ROIreq fields as shown in Tablet 1.

TABLE 1

C->S: SET_PARAMETER rtsp://videoserver.com/media.mp4 RTSP/1.0
   CSeq: 10
   Content-length: xxx
   Content-type: text/parameters
   ROIreq
   num_rois_minus1
   roi_priority_i
   roi_type_i
   roi_label_i
   roi_window_start_xpos_i
   roi_window_start_ypos_i
   roi_window_width_i
   roi_window_height_i The semantics of the various fields of the ROIreq are as follows. The field num_rois_minus1 specifies the number of ROIs in the request less one. The remaining fields are repeated for each ROI included in the request. The field roi_priority_i specifies the priority for an ROI i. The range of priorities may be implementation dependent. In some embodiments, the priority values may range from 0 to 255 with 0 implying the highest priority and 255 implying the lowest priority. The field roi_type_i specifies the type of ROI i. The particular ROI types used may be implementation dependent. Some examples of ROI types that may be used include facial region, text region, license plate region, watermark region, sky region, water region, grass region, etc.

The ROI type is helpful during video coding to determine quantization step sizes and coding modes (tools) to use, e.g., a text region could be encoded using transform skipping and a sky region could be encoded using a low quantization step size. The ROI type is also useful for post-processing decoded video. For example, facial region coordinates could be used during video stabilization to center video frames on the face. The facial region coordinates could also be input to a face recognition module and used video indexing purposes. In general, the ROI type may be used for domain specific post-processing.

The roi_label_i field specifies the label for the region of interest i. This label may be used to track ROIs from one frame to another. For example, a face can be assigned the same label throughout the video playback and this label can be used to track the face.

The remaining fields specify the position and size of an ROI. The roi_window_start_xpos_i and roi_window_start_ypos_i fields specify, respectively, the start x-position of ROI i and the start y-position of the ROI i in pixels. The roi_window_width_i and roi_window_height_i fields specify, respectively, the width and height of ROI i in pixels.

Referring again to FIG. 3, the response to the ROIreq is an acknowledgment of the request. Streaming of the video continues with improved quality in the ROIs identified in the ROIreq, e.g., a video encoder encoding the streamed video on the server uses the information in the ROIreq to improve video quality in the identified regions as per the specified priorities.

Figure 4:
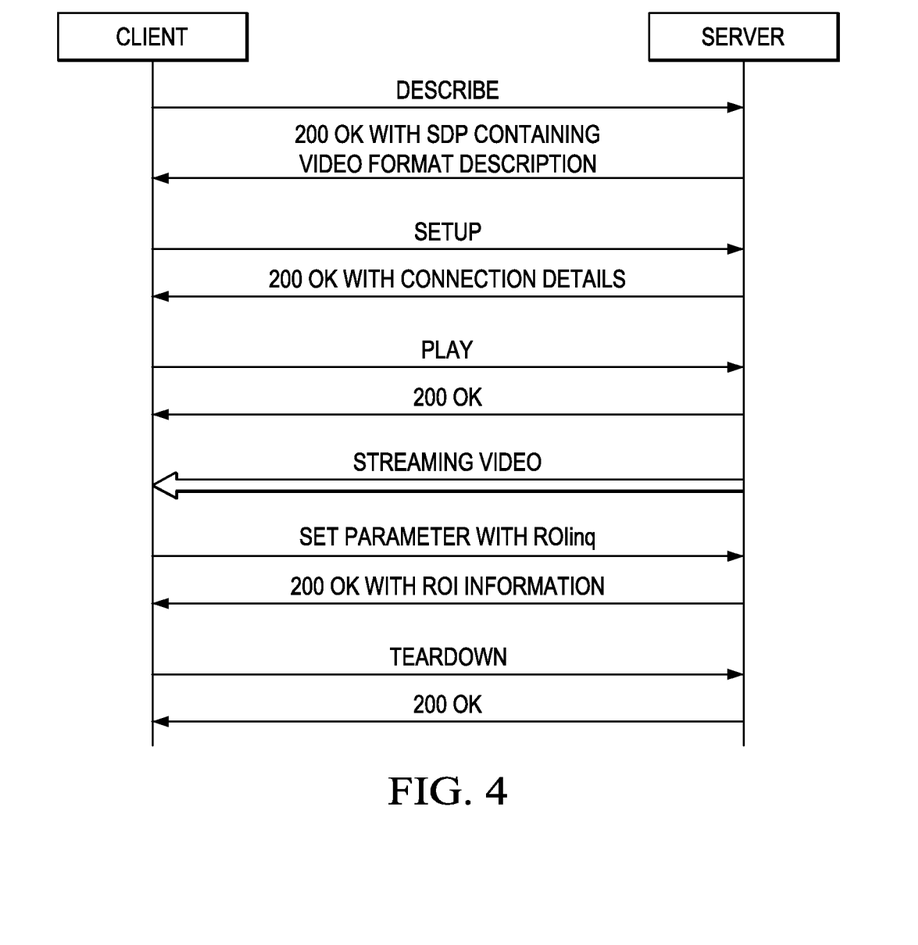

FIG. 4 is an example showing an RTSP video streaming session including an upstream ROIinq, e.g., an ROI inquiry from an intermediate node (the client) in a video chain to an upstream node (the server) in the chain. The streaming video session set-up (DESCRIBE and SETUP) occurs as described in reference to FIG. 2. The client then requests playback using the PLAY request and the server starts streaming the video. During the course of the streaming, the client may send a ROIinq to the server requesting content analysis for specific types of ROIs or for all types of ROIs that the server can identify. The ROIreq is accomplished by extending the SET_PARAMETER request to include ROIinq fields as shown in Table 2 or Table 3.

TABLE 2

C->S: SET_PARAMETER rtsp://videoserver.com/media.mp4 RTSP/1.0
   CSeq: 10
   Content-length: xxx
   Content-type: text/parameters
   ROIinq
   roi_type_1
   roi_type_2
   .
   .
   roi_type_n

TABLE 3

C->S: SET_PARAMETER rtsp://videoserver.com/media.mp4 RTSP/1.0
   CSeq: 10
   Content-length: xxx
   Content-type: text/parameters
   ROIinq
   all_roi The semantics of the various fields of the ROIinq in Table 2 are as follows. Each roi_type field includes requests a specific type of ROI content analysis. That is, roi_type_1 specifies a first type of ROI content analysis (e.g., face), roi_type_2 specifies a second type of ROI content analysis (e.g., sky), and roi_type_n specifies an nth type of ROI content analysis (e.g., grass). The particular types of ROI content analysis that can be requested may be implementation dependent. Some examples of ROI content analysis types that may be used include facial region detection, text region detection, license plate region detection, watermark region detection, sky region detection, water region detection, grass region detection, etc. In some embodiments, the ROI content analysis types are included that request detection of the action in a scene, e.g., a romantic scene or a suspenseful scene. For such ROI content analysis types, the ROI may be an entire image. Knowledge of the action in a scene may be used, for example, to avoid overlaying distracting elements on the video, e.g., logos or bottom screen advertising, during particular scenes.

The semantics of the field of the ROIinq in Table 3 are as follows. The all_roi indicates that the request is for all ROIs of all types that the server can identify.

Referring again to FIG. 4, the server replies back using 200 OK response extended to include the requested ROI information or a 404 Not found command. The extension of the 200 OK response to include the ROIinq response fields is shown in Table 4.

TABLE 4

S->C: RTSP/1.0 200 OK
   CSeq: 421
   Content-length: xxx
   Content-type: text/parameters
   ROIinq
   roi_type_1

TABLE 4-continued num_rois_minus1
   roi_priority_i
   roi_label_i
   roi_window_start_xpos_i
   roi_window_start_ypos_i
   roi_window_width_i
   roi_window_height_i
   roi_type_2
   num_rois_minus1
   roi_priority_i
   roi_label_i
   roi_window_start_xpos_i
   roi_window_start_ypos_i
   roi_window_width_i
   roi_window_height_i
   roi_type_n
   num_rois_minus1
   roi_priority_i
   roi_label_i
   roi_window_start_xpos_i
   roi_window_start_ypos_i
   roi_window_width_i
   roi_window_height_i The semantics of the various fields of the ROIinq response are as follows. In general, there is a set of fields in the response for each ROI type specified in the original ROIinq of Table 2 or to each ROI type identified by the server in response to the ROIinq of Table 3. Each set of fields for a type includes the type roi_type_x, the number of ROIs (less one) of that type found num_rois_minus1, and for each ROI i of the type, the priority roi_priority_i, the label roi_label_i, the location roi_window_start_xpos_i and roi_window_start_ypos_i, and the size roi_window_width_i and roi_window_height_i.

Figure 5:
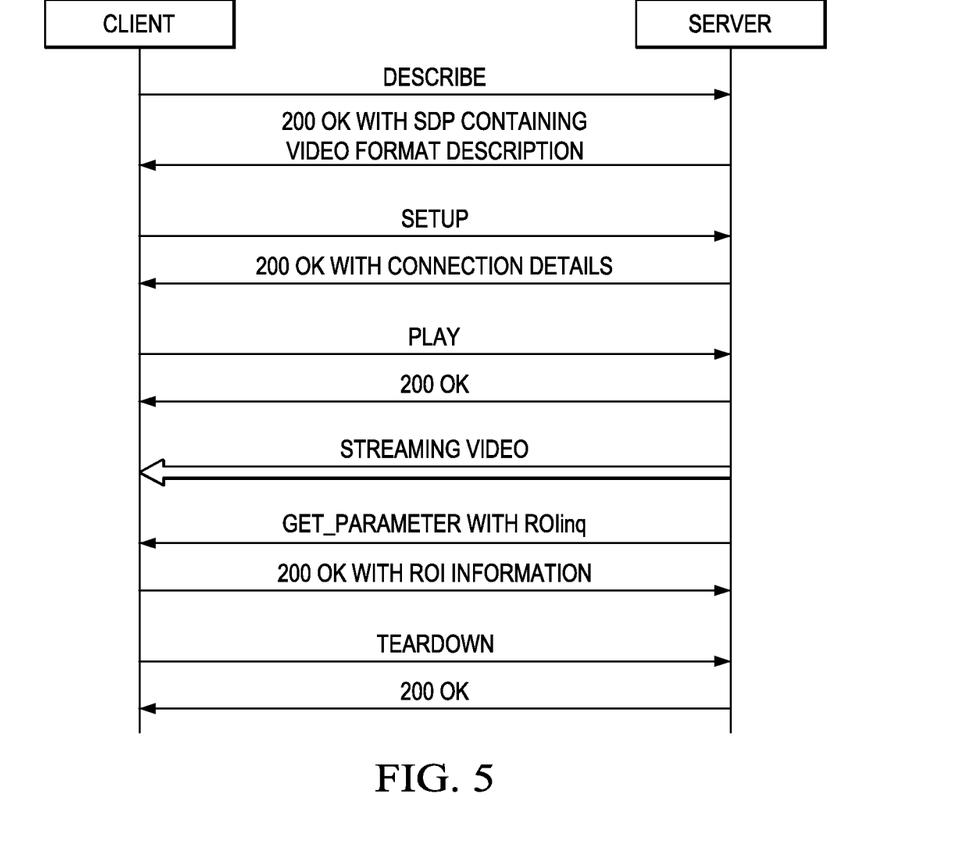

FIG. 5 is an example showing an RTSP video streaming session including a downstream ROIinq, e.g., an ROI inquiry from an intermediate node (the server) in a video chain to a downstream node (the client) in the chain. The streaming video session set-up (DESCRIBE and SETUP) occurs as described in reference to FIG. 2. The client then requests playback using the PLAY request and the server starts streaming the video. During the course of the streaming, the server may send a ROIinq to the client requesting content analysis for specific types of ROIs or for all types of ROIs that the client can identify. The ROIinq is accomplished by extending the GET_PARAMETER request to include ROIinq fields as shown in Table 5 or Table 6. The semantics of the various fields of the ROIreq are as previously described.

TABLE 5

GET_PARAMETER rtsp://videoserver.com RTSP/1.0
   CSeq: 10
   Content-length: xxx
   Content-type: text/parameters
   ROIinq
   roi_type_1
   roi_type_2
   .
   .
   roi_type_n

TABLE 6

GET_PARAMETER rtsp://videoserver.com/media.mp4 RTSP/1.0
   CSeq: 10
   Content-length: xxx
   Content-type: text/parameters TABLE 6-continued ROIinq
all_roi The client replies back using 200 OK response extended to include the requested ROI information or a 404 Not found command. The extension of the 200 OK response to include the ROIinq response fields is shown in Table 4.

Figure 6:
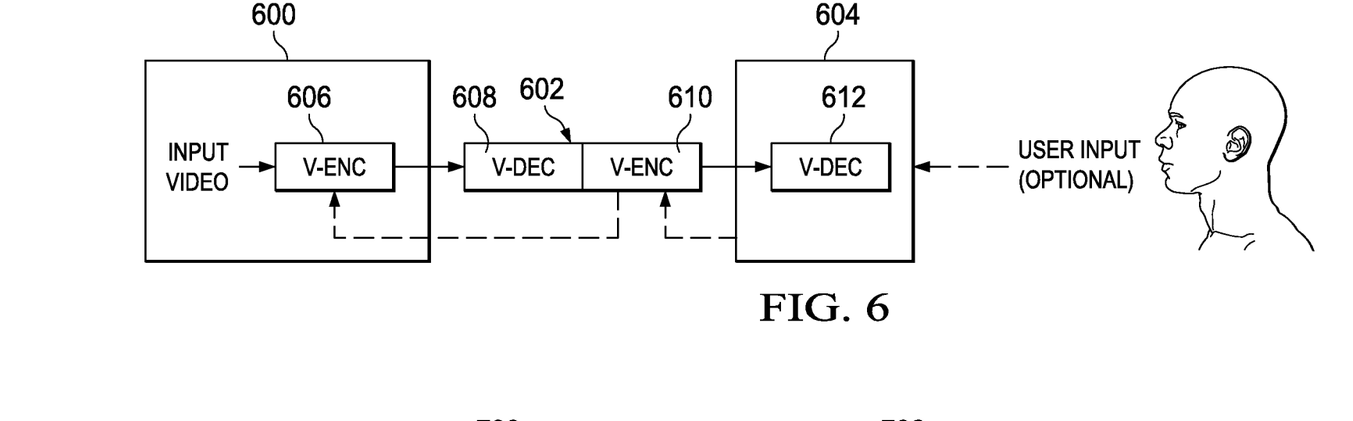
FIGS. 6-10 show examples of video chains configured to use an ROI protocol in a video streaming session.
Figure 7:
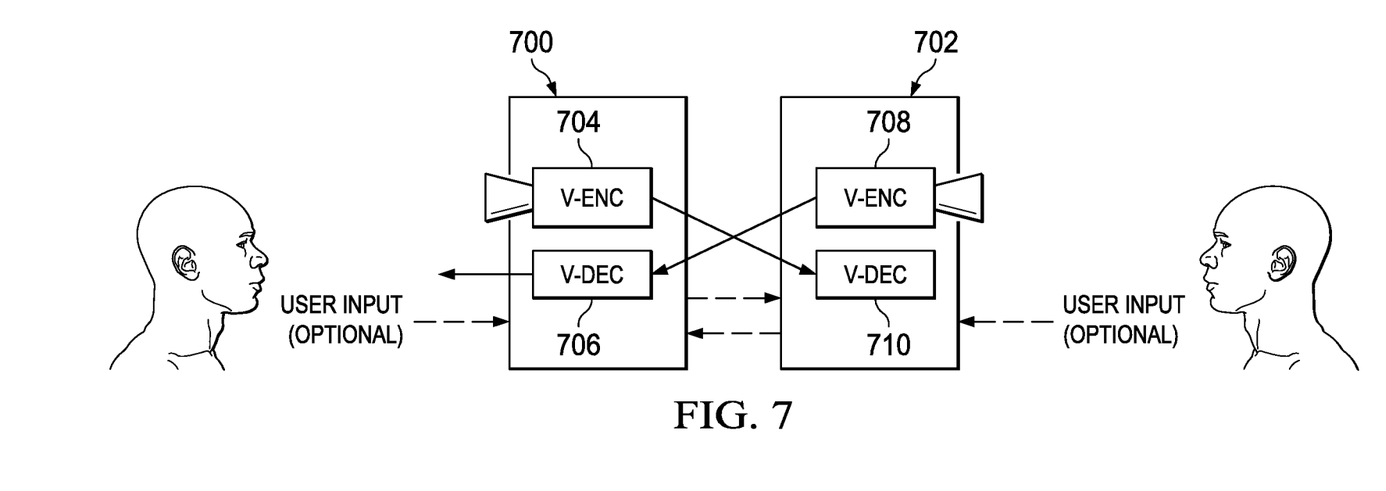
Figure 8:
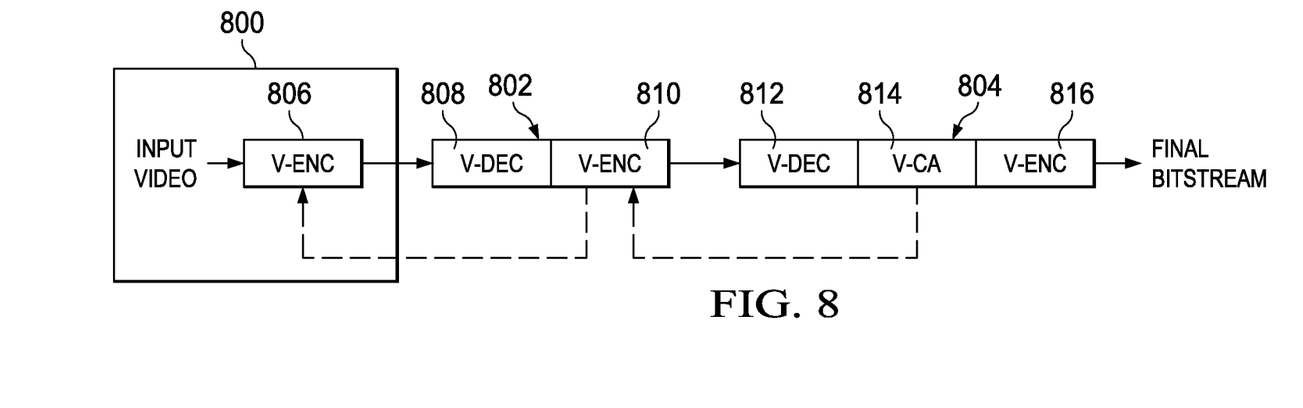
Figure 9:
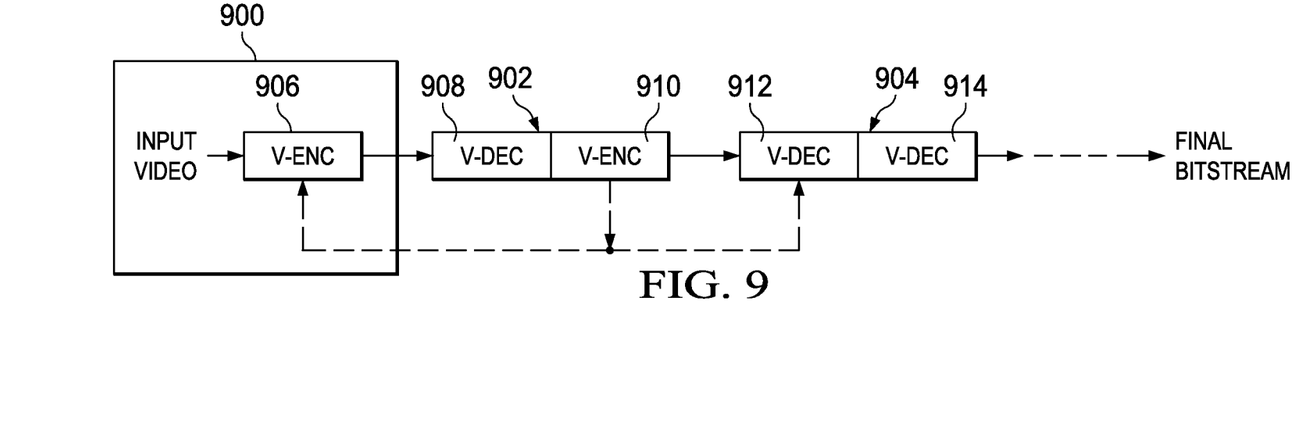
Figure 10:
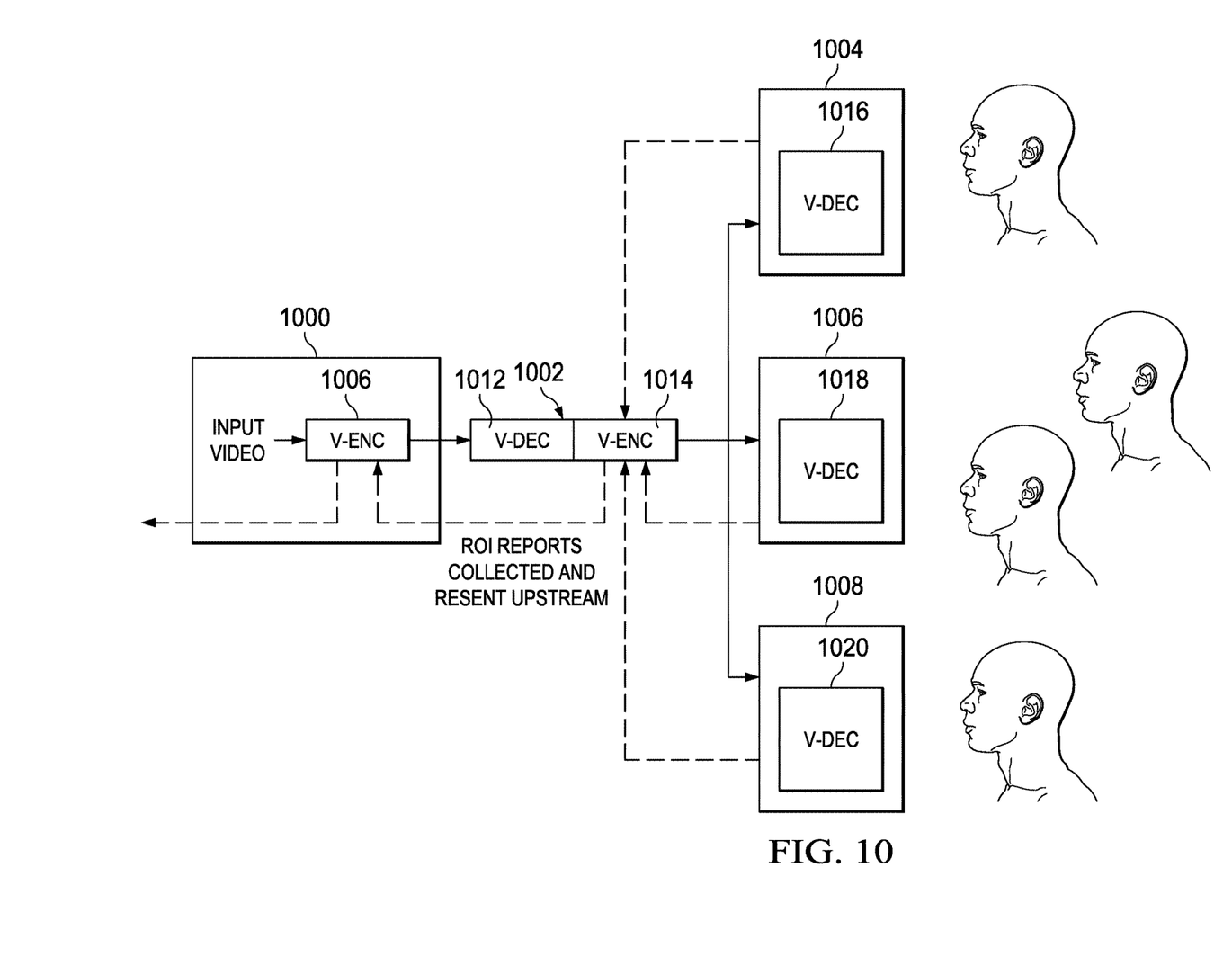

FIGS. 6-10 show example video chains configured to use an embodiment of the ROI protocol. In particular, FIGS. 6-8 illustrate use of an ROIreq and FIGS. 9 and 10 illustrate use of an ROIinq. In these examples, functionality for generating and transmitting RTSP packets with ROI protocol extensions as described above and for receiving and parsing RTSP packets with ROI protocol extensions as described above is not shown or described for the sake of simplicity. One of ordinary skill in the art will understand such functionality is present without need for illustration or detailed description. Further, the number of video nodes in these examples is small for simplicity of illustration. One of ordinary skill in the art will understand embodiments with more or few nodes.

The video chain of FIG. 6 includes an upstream video node 600, an intermediate video node 602, and a display video node 604. The upstream video node 600 includes a video encoder 606 that encodes an input video stream for transmission to the display video node 604. The intermediate video node 602 is configured to perform transcoding and/or trans-rating on an encoded bit stream received from the upstream video node 600, and thus includes a video decoder 608 and a video encoder 610. The display video node 604 is configured to decode and display an encoded bit stream received from the intermediate video node 602 and thus includes a video decoder 612.

In such a video chain, improvement of the video quality in one or more regions of interest to the user of the display video node 602, i.e., the viewer, may be desired. The display video node 604 includes functionality to identify one or more regions of interest for which higher quality video is desired as the video stream is displayed. Such an ROI may be identified, for example, by analyzing the gaze direction of the user watching the displayed video or by manual user input, e.g., by the user touching the display screen. For simplicity, identification of a single ROI is assumed. The display video node 604 may also include content analysis functionality to determine the type of content in an identified ROI.

In operation, the display video node 604 sends an ROIreq including data describing the identified ROI to the intermediate video node 602. If the video encoder 610 includes functionality to perform ROI based coding, the request for improved video content may be fulfilled by the intermediate video node 602. In this instance, the display video node 604 is the client in the example of FIG. 3 and the intermediate video node 602 is the server. Otherwise, the intermediate video node 602 may send an ROIreq to the upstream video node 600. This ROIreq includes the same ROI data as the ROIreq sent by the display video node 604. If the video encoder 606 includes functionality to perform ROI based coding, the request for improved video content may be fulfilled by the upstream video node 600. In this instance, the intermediate video node 604 is the client in the example of FIG. 3 and the upstream video node 600 is the server.

The video chain of FIG. 7 illustrates a simple video conferencing scenario. The video chain includes two display video nodes 700, 702. Each display video node includes a camera 704, 708 with a video encoder for capturing and encoding a video stream of the video conference participant using the display video node and of any materials the video conference participant chooses to share with the other participant. These video encoders are configured to perform ROI based video coding. Each display video node also includes a video decoder 706, 710 for use in decoding the encoded bit stream received from the other display video node.

In such a video chain, improvement of the video quality in one or more regions of interest to the users of the display video nodes 700, 702, i.e., the video conference participants, may be desired. Each display video node includes functionality to identify one or more regions of interest for which higher quality video is desired as the video stream is displayed. Such an ROI may be identified, for example, by analyzing the gaze direction of the user watching the displayed video or by manual user input, e.g., by the user touching the display screen. For simplicity, identification of a single ROI is assumed. The display video nodes 700, 702 may also include content analysis functionality to determine the type of content in an identified ROI, e.g., face detection.

In operation, a display video node sends an ROIreq including data describing the identified ROI to the other display video node and the request for improved video content Is fulfilled by the video encoder in the receiving display video node. In this scenario, each of the display video nodes 700, 702 may be the client in the example of FIG. 3 when making an ROIreq and each may also be the server when fulfilling an ROIreq.

The video chain of FIG. 8 includes an upstream video node 800, an intermediate video node 802, and a downstream video node 804. The upstream video node 800 includes a video encoder 806 that encodes an input video stream for transmission through the chain to a display video node (not shown). The intermediate video node 802 is configured to perform transcoding and/or trans-rating on an encoded bit stream received from the upstream video node 800, and thus includes a video decoder 808 and a video encoder 810. The downstream video node 804 is configured to perform content analysis on an encoded bit stream received from the intermediate video node 802 and to re-encode the video stream using the results of the content analysis. The downstream video node 804 thus includes a video decoder 812, a content analysis module 814, and a video encoder 816.

In such a video chain, improvement of the video quality in one or more ROIs identified by the content analysis module 814 of the downstream video node 804 may be desired so that the content analysis module 814 can perform a better analysis. For example, the content analysis module 814 may include face detection functionality. If a face or faces are located with low confidence, a request for higher quality data for the face candidate region or regions may be triggered. For simplicity, identification of a single ROI is assumed.

In operation, the content analysis module 814 identifies an ROI that may be better analyzed if the quality of the video content is improved. The downstream video node 804 sends an ROIreq including data describing the identified ROI to the intermediate video node 802. If the video encoder 810 includes functionality to perform ROI based coding, the request for improved video content may be fulfilled by the intermediate video node 802. In this instance, the downstream video node 804 is the client in the example of FIG. 3 and the intermediate video node 802 is the server. Otherwise, the intermediate video node 802 may send an ROIreq to the upstream video node 800. This ROIreq includes the same ROI data as the ROIreq sent by the downstream video node 804. If the video encoder 806 includes functionality to perform ROI based coding, the request for improved video content may be fulfilled by the upstream video node 800. In this instance, the intermediate video node 804 is the client in the example of FIG. 3 and the upstream video node 800 is the server.

The video chain of FIG. 9 includes an upstream video node 900, an intermediate video node 902, and a downstream video node 904. The upstream video node 900 includes a video encoder 906 that encodes an input video stream for transmission through the chain to a display video node (not shown). The downstream video node 904 may be any type of video node that performs some operation or operations on an encoded bit stream received from the intermediate video node 904 and re-encodes the video stream for further transmission in the chain.

The intermediate video node 902 is configured to perform operations on ROIs of one or more types in the video stream content received from the upstream video node 900 but does not have the content analysis capability to detect the ROIs. The intermediate video node 902 includes both a video decoder 908 and a video encoder 910. For example, the video encoder 910 may be capable of performing ROI based encoding for different types of ROIs but the intermediate video node 902 cannot detect the ROIs. In another example, the intermediate video node 902 may be a content aware video display node with functionality to post-process various types of regions differently, e.g., to adjust the colors and contrast of sky regions to improve the visual effect or to improve the display quality of faces but intermediate video node 902 cannot detect such ROIs.

In such a video chain, an ROIinq may be used to request that another node in the chain perform the analysis to identify the desired ROIs. The ROIinq may be sent upstream or downstream. In operation, the intermediate video node 902 may send an ROIinq identifying the type or types of ROIs that are of interest upstream or downstream. For example, the intermediate video node 902 may first send the ROIinq upstream. If the ROIinq cannot be fulfilled in that direction, the intermediate video node 902 may then send the ROIinq downstream.

If the ROIinq is sent upstream, the ROIinq is received by the upstream video node 900. If the upstream video node 900 includes functionality to perform the needed content analysis to identify ROIs of the requested type or types, the inquiry may be fulfilled by the upstream video node 900 and the requisite response according to the ROI protocol returned to the intermediate video node 902. In this instance, the intermediate video node 902 is the client in the example of FIG. 4 and the upstream video node 900 is the server. Otherwise, the upstream video node 900 may send an ROIinq with the same content to another video node further upstream or indicate that the inquiry cannot be fulfilled.

If the ROIinq is sent downstream, the ROIinq is received by the downstream video node 904. If the downstream video node 904 includes functionality to perform the needed content analysis to identify ROIs of the requested type or types, the inquiry may be fulfilled by the downstream video node 904 and the requisite response according to the ROI protocol returned to the intermediate video node 902. In this instance, the intermediate video node 902 is the server in the example of FIG. 5 and the downstream video node 904 is the client. Otherwise, the downstream video node 904 may send an ROIinq with the same content to another video node further downstream or indicate that the inquiry cannot be fulfilled.

The video chain of FIG. 10 includes an upstream video node 1000, an intermediate video node 1002, and three display video nodes 1004, 1006, 1008. The upstream video node 1000 includes a video encoder 1006 that encodes an input video stream for transmission to the display video nodes 1004, 1006, 1008. The intermediate video node 1002 is configured to perform transcoding and/or trans-rating on an encoded bit stream received from the upstream video node 1000, and thus includes a video decoder 1008 and a video encoder 1010. The display video nodes 1004, 1006, 1008 are each configured to decode and display an encoded bit stream received from the intermediate video node 1002 and thus each includes a video decoder 1016, 1018, 1020.

In such a video chain, collection of statistical information regarding the particular regions of the displayed video to which users of the display video nodes 1004, 1006, 1008 are paying attention may be desired. This information may be used, for example, to optimize various aspects of the underlying video chain, including transcoding & streaming servers and network routers. For example, analysis of user ROIs as users are viewing a movie with subtitles might indicate that a large portion of the users in a given geographic area are reading the subtitles more than users in other geographic areas. In such a case, the video provider can increase the quality of the subtitle ROI coding for the former users to improve readability. Similarly, if analysis of user ROIs shows that no significant attention is paid to the subtitles, the encoding quality in the subtitles can be reduced to increase quality in other parts of the images. In another example, the analysis of user ROIs can be used to determine what advertisements or objects the users are focusing on and this information can be used to select more user specific advertising. The intermediate video node 1002 includes functionality to poll each of the display video nodes 1004, 1006, 1008 periodically to collect statistics regarding current ROIs of users and to forward the collected statistics upstream.

In operation, the intermediate video node 1002 sends an ROIinq to each of the display video nodes 1004, 1006, 1008 in turn to request the current ROI or ROIs of users of the display video nodes. The ROIinq specifies an ROI type indicating that the current ROI or ROIs of the user or users is to be returned. A display video node receiving such an ROIinq determines the current ROI (when there is a single user or all users are looking at the same region) or ROIs (when there are multiple users that may be looking at two or more regions) and the requisite response according to the ROI protocol is returned to the intermediate video node 1002. A display video node may determine the ROI of a user by, for example, analyzing the gaze direction of the user. In this instance, the intermediate video node 1002 is the server in the example of FIG. 5 and each of the display video nodes 1004, 1006, 1008 is in turn the client. Note that if a particular display video node does not include functionality to identify ROIs of users, the node may respond to the ROIinq indicating that the inquiry cannot be fulfilled.

Figure 11:
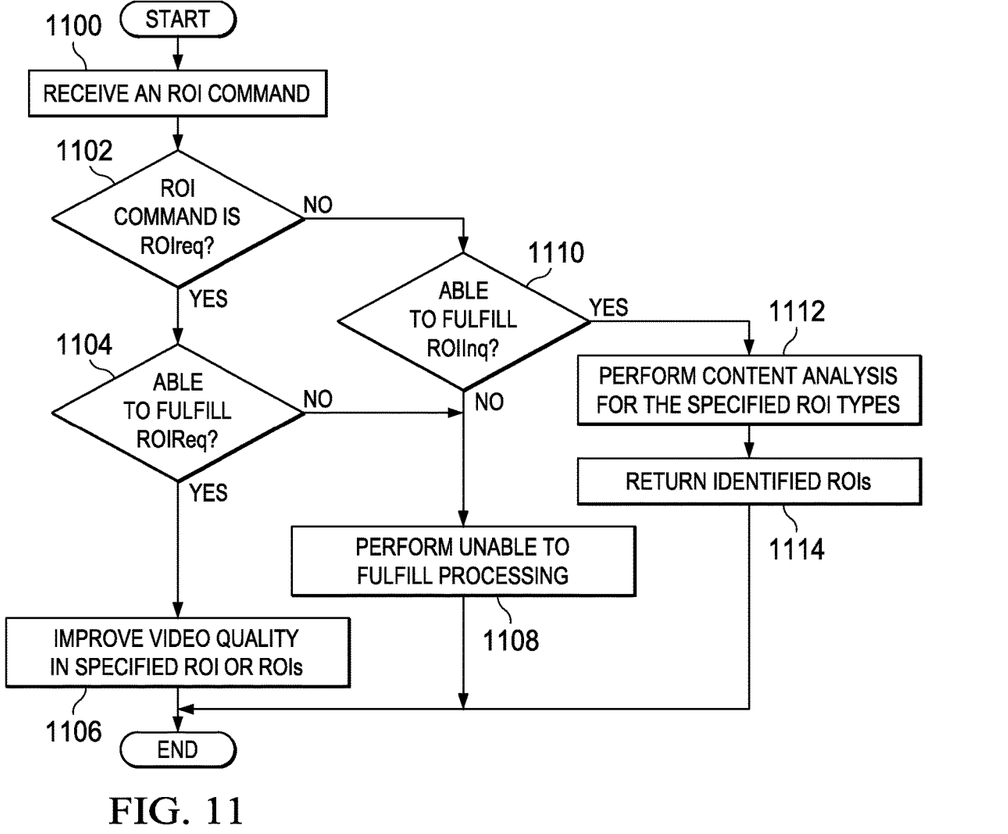
FIGS. 11-13 are flow diagrams of methods.

FIG. 11 is a flow diagram of a method for processing an ROI command that may be performed by a video node in a video chain. An ROI command may be an ROIreq command or an ROIinq command as previously described herein. Initially, an ROI command from the downstream node in the video chain is received 1100 by the video node. If the ROI command is an ROIreq 1102, and the video node is able to fulfill the 1104 the ROIreq, then the video node improves 1106 the quality of the video in the ROI or ROIs specified in the ROIreq before transmitting the video bit stream to the next node in the video chain. As previously discussed herein, the particular quality improvement performed in an ROI may depend on the type of the ROI. If the video node cannot fulfill the ROIreq 1104, then some type of "unable to fulfill" processing is performed 1108. For example, if there is another node upstream from the video node, the video node may forward the ROIreq to that node by generating a new ROIreq with the same ROI data as in the received ROIreq and sending the new ROIreq to the upstream node. If there is no other upstream node, the video node may send an unable to fulfill response to the node that sent the ROIreq.

If the ROI command is not an ROIreq 1102, it is an ROIinq. If the video node cannot fulfill the ROIinq 1110, then some type of "unable to fulfill" processing is performed 1108. For example, if there is another node upstream from the video node, the video node may forward the ROIinq to that node by generating a new ROIinq with the same ROI data as in the received ROIinq and send the new ROIinq to the upstream node. If there is no other upstream node, the video node may send an unable to fulfill response to downstream node that sent the ROIinq.

If the video node is able to fulfill the ROIinq 1110, then the node attempts to locate an ROI or ROIs according to the type or types specified in the ROIinq. For example, the node may perform content analysis on the video stream to search for the ROI type or types. The video node than returns 1114 information about the identified ROIs, if any, to the requesting downstream node in the format specified by the ROI protocol.

Figure 12:
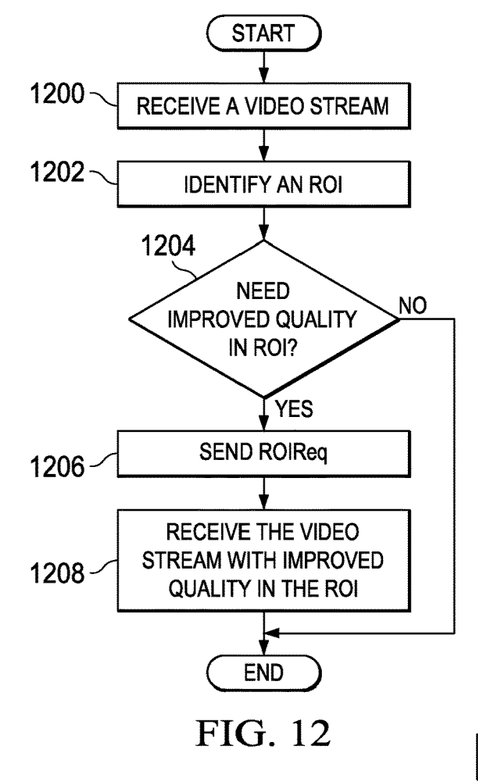

FIG. 12 is a flow diagram of a method for requesting improved quality in an ROI that may be performed by a video node in a video chain. For simplicity of explanation, a single ROI is assumed. One of ordinary skill in the art will understand embodiments in which the quality improvement request may include more than one ROI.

Initially, a video stream is received 1200 by the video node. The video node then identifies 1202 an ROI in the video stream. The ROI may be identified, for example, by performing content analysis on the video stream or by analyzing gaze direction of a user viewing the video. If the video node needs improved quality in the ROI 1204, then the video node sends 1206 an ROIreq with information describing the ROI to the upstream node in the video chain. In response to the ROIreq (provided the request can be fulfilled upstream), the video stream is subsequently received 1208 by the video node with improved quality in the ROI.

Figure 13:
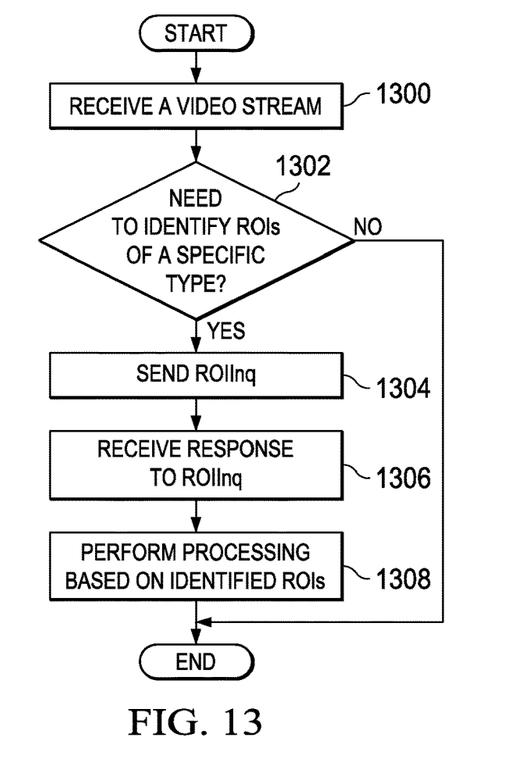

FIG. 13 is a flow diagram of a method for requesting identification of an ROI of a specified type that may be performed by a video node in a video chain. For simplicity of explanation, a request for ROIs of a single type is assumed. One of ordinary skill in the art will understand embodiments in which the identification request may include more than one ROI type.

Initially, a video stream is received 1300 by the video node. If the video node needs to identify ROIs in the video stream of a specific type 1302, then the video node sends 1304 an ROIinq for identification of ROIs of the type to an upstream or downstream video node in the video chain. The video node then receives 1306 a response to the ROIinq (provided the command could be fulfilled by the node receiving the ROIinq) containing information about any identified ROIs of the specified type. The video node may then perform 1308 further processing based on the identified ROIs.

Figure 14:
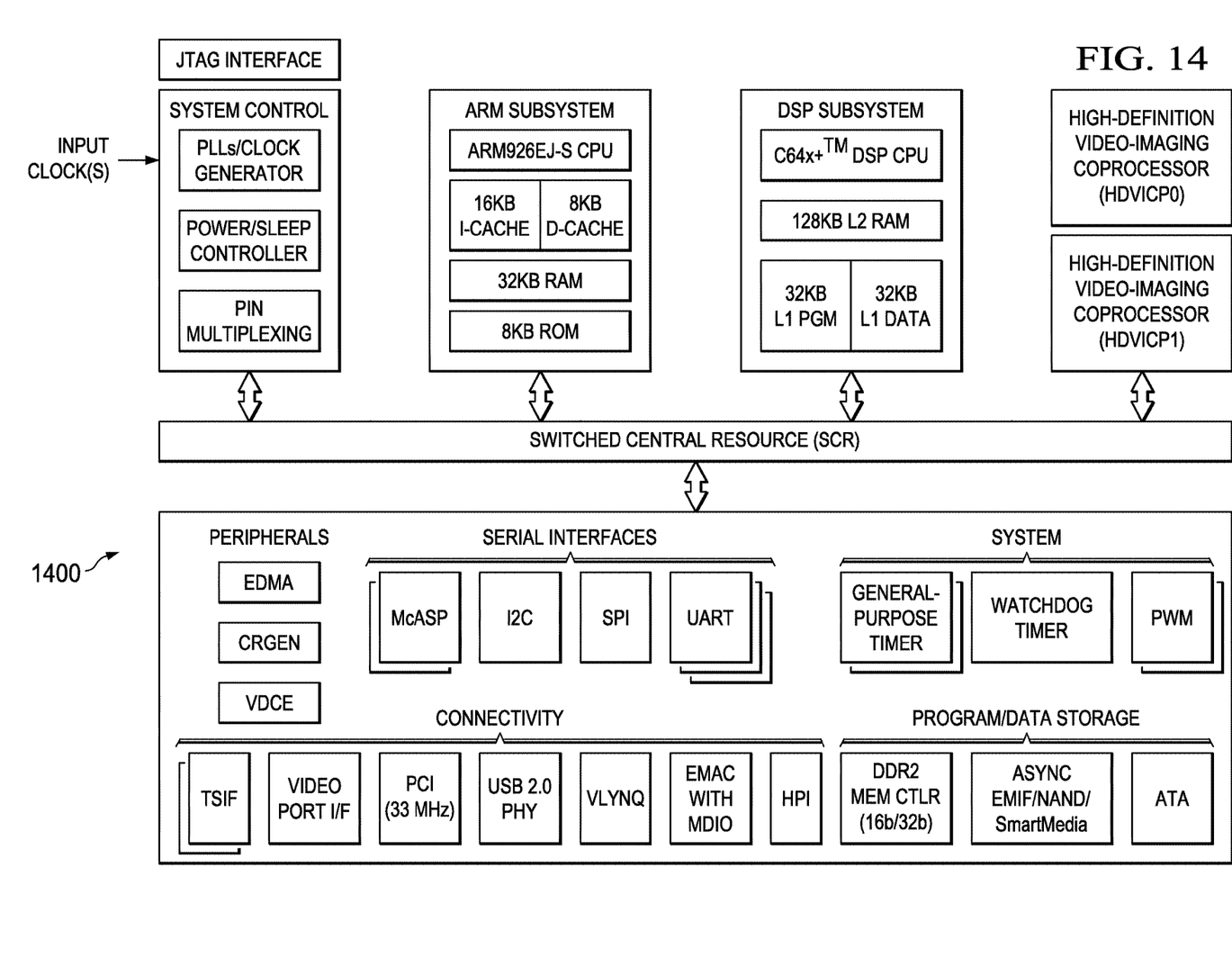
FIG. 14 is a block diagram of an illustrative digital system.

FIG. 14 is a block diagram of an example digital system suitable for use as an embedded system in a node of a video chain. The digital system may be configured to encode a video stream and/or to decode a compressed video bit stream, to perform trans-rating or transcoding, to perform content analysis, etc. as needed to fulfill particular functions to be performed by the video node. This example system-on-a-chip (SoC) is representative of one of a family of DaVinci™ Digital Media Processors, available from Texas Instruments, Inc. This SoC is described in more detail in "TMS320DM6467 Digital Media System-on-Chip", SPRS403G, December 2007 or later, which is incorporated by reference herein.

The SoC 1400 is a programmable platform designed to meet the processing needs of applications such as video encode/decode/transcode/transrate, video surveillance, video conferencing, set-top box, medical imaging, media server, gaming, digital signage, etc. The SoC 1400 provides support for multiple operating systems, multiple user interfaces, and high processing performance through the flexibility of a fully integrated mixed processor solution. The device combines multiple processing cores with shared memory for programmable video and audio processing with a highly-integrated peripheral set on common integrated substrate.

The dual-core architecture of the SoC 1400 provides benefits of both DSP and Reduced Instruction Set Computer (RISC) technologies, incorporating a DSP core and an ARM926EJ-S core. The ARM926EJ-S is a 32-bit RISC processor core that performs 32-bit or 16-bit instructions and processes 32-bit, 16-bit, or 8-bit data. The DSP core is a TMS320C64x+TM core with a very-long-instruction-word (VLIW) architecture. In general, the ARM is responsible for configuration and control of the SoC 1400, including the DSP Subsystem, the video data conversion engine (VDCE), and a majority of the peripherals and external memories. The switched central resource (SCR) is an interconnect system that provides low-latency connectivity between master peripherals and slave peripherals. The SCR is the decoding, routing, and arbitration logic that enables the connection between multiple masters and slaves that are connected to it.

The SoC 1400 also includes application-specific hardware logic, on-chip memory, and additional on-chip peripherals. The peripheral set includes: a configurable video port (Video Port I/F), an Ethernet MAC (EMAC) with a Management Data Input/Output (MDIO) module, a 4-bit transfer/4-bit receive VLYNQ interface, an inter-integrated circuit (I2C) bus interface, multichannel audio serial ports (McASP), general-purpose timers, a watchdog timer, a configurable host port interface (HPI); general-purpose input/output (GPIO) with programmable interrupt/event generation modes, multiplexed with other peripherals, UART interfaces with modem interface signals, pulse width modulators (PWM), an ATA interface, a peripheral component interface (PCI), and external memory interfaces (EMIFA, DDR2). The video port I/F is a receiver and transmitter of video data with two input channels and two output channels that may be configured for standard definition television (SDTV) video data, high definition television (HDTV) video data, and raw video data capture.

As shown in FIG. 14, the SoC 1400 includes two high-definition video/imaging coprocessors (HDVICP) and a video data conversion engine (VDCE) to offload many video and image processing tasks from the DSP core. The VDCE supports video frame resizing, anti-aliasing, chrominance signal format conversion, edge padding, color blending, etc. The HDVICP coprocessors are designed to perform computational operations required for video encoding and/or decoding such as motion estimation, motion compensation, intra-prediction, transformation, inverse transformation, quantization, and inverse quantization. Further, the distinct circuitry in the HDVICP coprocessors that may be used for specific computation operations is designed to operate in a pipeline fashion under the control of the ARM subsystem and/or the DSP subsystem.

Other Embodiments

While the invention has been described with respect to a limited number of embodiments, those skilled in the art, having benefit of this disclosure, will appreciate that other embodiments can be devised which do not depart from the scope of the invention as disclosed herein. For example, embodiments of an ROI protocol have been described herein in which specific fields are defined for communicating ROI information. One of ordinary skill in the art will understand embodiments in which more, fewer, and/or different fields may used to communicate the desired ROI information. The particular fields used and the semantics of the fields may be implementation specific. For example, in some embodiments, the label field may not be present.

Embodiments of the video nodes of a video chain may be implemented in hardware, software, firmware, or any combination thereof. Any software instructions may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
transmitting, by a first device to a second device, a video stream in a video chain;
receiving, by the first device from the second device, a region of interest (ROI) request, wherein the ROI request comprises a first ROI type indicator that indicates a type of a first ROI, a second ROI type indicator that indicates a type of a second ROI, a first ROI priority field that indicates a first priority of the first ROI, and a second ROI priority field that indicates a second priority of the second ROI, wherein the first ROI priority field indicates a higher priority than the second ROI priority field, wherein the type of the first ROI is different than the type of the second ROI, and wherein the first ROI request is based on statistical information collected about a set of third devices;
modulating, by the first device, a quantization step size of the first ROI in the video stream based on the first ROI type indicator and the first ROI priority field; and modulating, by the first device, a quantization step size of the second ROI in the video stream based on with the second ROI type indicator and the second ROI priority field.

2. The method of claim 1, wherein the ROI request is transmitted using Real Time Streaming Protocol.

3. A system comprising:
a first device; and
a second device communicatively coupled to the first device; and
wherein the first device comprises:
at least one first processor; and
a first non-transitory computer readable storage medium storing a first program for execution by the at least one first processor, the first program including first instructions to:
transmit a video stream to the second device;
receive a region of interest (ROI) inquiry from the second device, wherein the ROI inquiry comprises a first ROI type indicator that indicates a first ROI type and a second ROI type indicator that indicates a second ROI type, wherein the first ROI type is different than the second ROI type, and wherein the first ROI inquiry is based on statistical information collected about a set of third devices;
identify a first ROI of the first ROI type in the video stream;
identify a second ROI of the second ROI type in the video stream; and
modulate a quantization step size of the first ROI in the video stream based on the first ROI type indicator and the first ROI priority field; and
modulate a quantization step size of the second ROI in the video stream based on with the second ROI type indicator and the second ROI priority field.

4. The system of claim 3, wherein the ROI inquiry further comprises information about a location of the first ROI and a size of the first ROI.

5. The system of claim 3, wherein the first instructions further comprise first instructions to:
receive an ROI request from the second device, wherein the ROI request comprises at least one ROI type indicator that indicates a type of at least one ROI and at least one ROI priority field that indicates a priority of the at least one ROI.

6. The system of claim 5, wherein the second device comprises:
at least one second processor; and
a second non-transitory computer readable storage medium storing a second program for execution by the at least one second processor, the second program including second instructions to:
identify the at least one ROI, wherein the ROI inquiry response comprises information about at least one location of the at least one ROI and a size of the at least one ROI, and wherein the at least one ROI is based on a number of POI inquiries received from devices of the set of third devices; and
receive, from the first device, the video stream in which quality of the at least one ROI is improved,
wherein the first instructions further comprise first instructions to improve quality in the at least one ROI in the video stream based on the ROI type indicator.

7. The system of claim 3, wherein the ROI inquiry is transmitted using Real Time Streaming Protocol.

8. A first device, comprising:

at least one processor; and a non-transitory computer readable storage medium storing a program for execution by the at least one processor, the program including instructions to:

transmit, to a second device, a video stream;

receive, from the second device, a region of interest (ROI) inquiry, wherein the ROI comprises a first ROI type indicator that indicates a first ROI type and a second ROI type indicator that indicates a second ROI type, wherein the first ROI type is different than the second ROI type, and wherein the ROI inquiry is based on statistical information collected about a set of third devices;

identify a first ROI of the first ROI type in the video stream;

identify a second ROI of the second ROI type in the video stream; and modulate a quantization step size of the first ROI in the video stream based on the first ROI type indicator and the first ROI priority field; and modulate a quantization step size of the second ROI in the video stream based on with the second ROI type indicator and the second ROI priority field.

9. The first device of claim 8, wherein the ROI inquiry further comprises information about a location of the first ROI and a size of the first ROI.

10. The first device of claim 8, wherein the instructions further comprise instructions to:

receive an ROI request from the second device, wherein the ROI request comprises at least one ROI type indicator that indicates a type of at least one ROI and at least one ROI priority field that indicates a priority of the at least one ROI.

11. The method of claim 1, further comprising:

receiving, by the first device from the second device, an ROI inquiry, wherein the ROI inquiry comprises at least one ROI type indicator for at least one ROI in the video stream;

identifying, by the first device, at least one identified ROI of the at least one ROI type; and transmitting, by the first device to the second device, an ROI inquiry response comprising at least one ROI label of the at least one identified ROI and at least one ROI priority of the at least one identified ROI.

12. The method of claim 1, wherein the ROI request further comprises an indicator of a number of ROIs in the ROI request and a first label for the first ROI.

13. The method of claim 11, wherein the ROI inquiry response further comprises information about a location of the at least one identified ROI and a size of the at least one identified ROI.

14. The first device of claim 8, wherein the ROI inquiry response further comprises an indicator of (a number of ROIs minus one) and a label of the first ROI.

15. The first device of claim 9, wherein the ROI inquiry response further comprises a first window start x position for the first ROI, a first window start y position for the first ROI, a first window width for the first ROI, and a first window height for the first ROI.

16. The method of claim 1, wherein the statistical information is based on ROI inquiries received from devices of the set of third devices.

17. The first device of claim 8, wherein the statistical information is based on ROI inquiries received from devices of the set of third devices.

18. The method of claim 13, wherein the ROI request further comprises a first window start x position for the first ROI, a first window start y position for the first ROI, a first window width for the first ROI, and a first window height for the first ROI.

* * * * *